United States Patent [19]

Halder

[11] Patent Number: 4,768,587
[45] Date of Patent: Sep. 6, 1988

[54] PIPE CONNECTION FOR HEAT EXCHANGERS

[75] Inventor: Prasanta Halder, Ditzingen, Fed. Rep. of Germany

[73] Assignee: Süddeutsche Kühlerfabrik Julius Fr. Behr GmbH & Co. KG, Stuttgart, Fed. Rep. of Germany

[21] Appl. No.: 102,796

[22] Filed: Sep. 24, 1987

Related U.S. Application Data

[63] Continuation of Ser. No. 861,438, May 9, 1986, abandoned.

[30] Foreign Application Priority Data

May 15, 1985 [DE] Fed. Rep. of Germany ....... 3517488

[51] Int. Cl.$^4$ ............................................. F16L 37/14
[52] U.S. Cl. .................................. 165/177; 285/305; 285/321; 285/330
[58] Field of Search ................ 165/173, 177; 285/305, 285/321, 330

[56] References Cited

U.S. PATENT DOCUMENTS

| 1,075,281 | 10/1913 | Anderson | 285/330 X |
|---|---|---|---|
| 2,021,241 | 11/1935 | Mall | 285/305 X |
| 3,154,327 | 10/1964 | Rothschild | 285/305 X |
| 3,215,455 | 11/1965 | Fiala et al. | 285/321 X |
| 3,287,032 | 11/1966 | Kraybill | 285/330 X |
| 3,414,299 | 12/1968 | Roe | 285/321 X |
| 3,527,485 | 9/1970 | Goward et al. | 285/305 |
| 3,929,356 | 12/1975 | DeVincent et al. | 285/305 |
| 4,423,892 | 1/1984 | Bartholomew | 285/321 X |

FOREIGN PATENT DOCUMENTS

| 0072889 | 3/1983 | European Pat. Off. | 285/305 |
|---|---|---|---|
| 1914465 | 10/1970 | Fed. Rep. of Germany | 285/305 |
| 2411352 | 8/1979 | France | 285/305 |
| 573227 | 2/1958 | Italy | 165/174 |
| 0569915 | 11/1975 | Switzerland | 205/305 |
| 0974024 | 11/1982 | U.S.S.R. | 285/305 |

OTHER PUBLICATIONS

Vesci, A., "Quick-Connect Tube Fitting", vol. 20, No. 9, Feb. 1978, IBM Technical Disclosure Bulletin, pp. 3662-3663.

Primary Examiner—Douglas Hart
Attorney, Agent, or Firm—Barnes & Thornburg

[57] ABSTRACT

A pipe connection arrangement for a water tank of a heat exchanger of a motor vehicle heater includes a pipe equipped with a collar at a pipe end for inserting into a connecting sleeve at the water tank. The pipe is provided with a seal on a first side of the collar, with the seal being pressed tightly into a recess in the connecting sleeve. A holding clamp rests on the other side of the collar facing away from the seal with the holding clamp being formed asd a U-shape. The clamp is developed in such a way that its U-bracket-shaped part rests tightly against the pipe exterior. This design results in the load transmission being evenly transmitted over a relatively large surface area. The sleeve includes openings formed as slots for receiving the clamp, with a reinforcing web provided in the center of the slots. The clamp is secured by another gripping part that projects from the bracket part and engages behind a reinforcing web of the connecting sleeve. Another advantage the invention provides is the possibility of mounting pipes closely at water tanks without any screwed connection and providing a largely even sealing force.

11 Claims, 3 Drawing Sheets

Fig. 1
Fig. 2
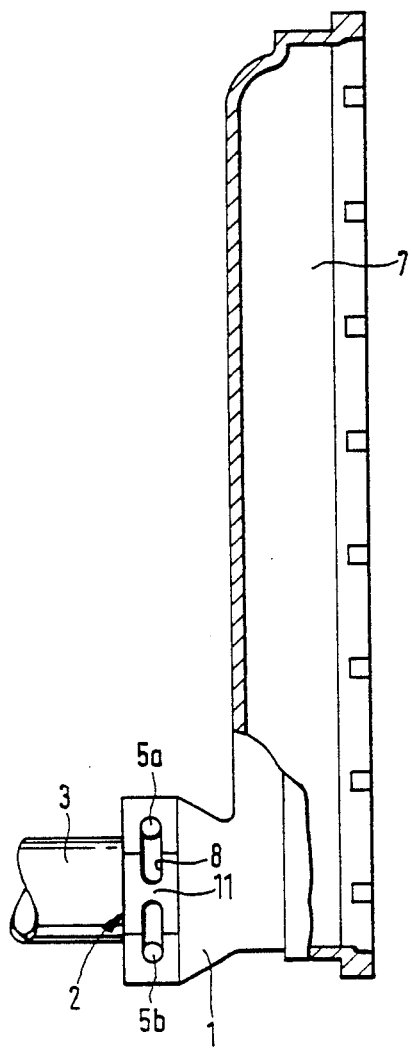
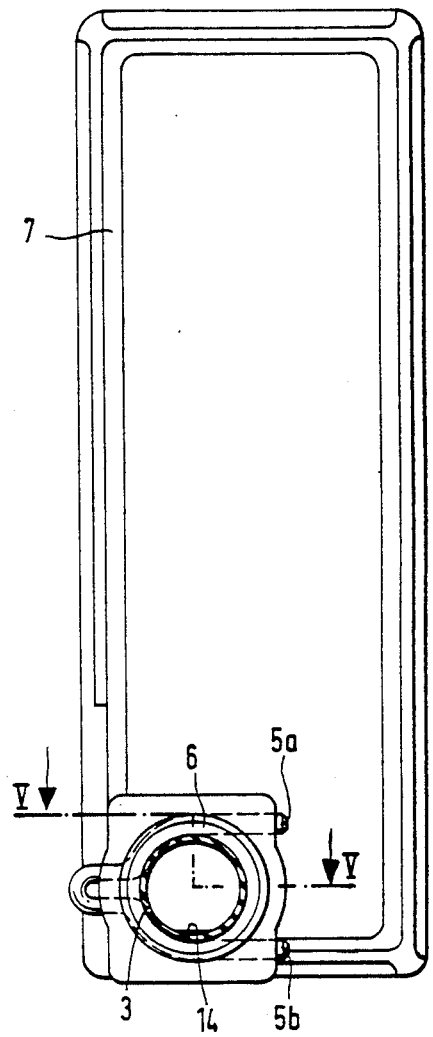

PIPE CONNECTION FOR HEAT EXCHANGERS

This is a continuation of application Ser. No. 861,438, filed May 9, 1986, and now abandoned.

BACKGROUND AND SUMMARY OF INVENTION

The invention relates generally to a pipe connection arrangement such as that required for a water tank of a heat exchanger of a motor vehicle heater. In particular, a preferred embodiment of the pipe arrangement includes an insertable pipe end that is equipped with a sealing means. The pipe end is tightly inserted into an opening of a connecting sleeve and held in this position by means of a U-shaped clamp. The legs of the clamp are guided through passage openings in the connecting sleeve and rest against a collar of the pipe end.

In German Published Unexamined patent application DE-OS No. 31 26 405, a pipe connection is described having the form of an insertion coupling for hydraulic high-pressure piping. In this connection, two collar-type shoulders respectively are assigned to the pipe end that form a groove between one another. Legs of a U-shaped clamp having a square cross-section engage in this groove for securing the coupled position. The pipe is sealed in the connecting sleeve by means of an O-ring which is held in a groove at the free end of the pipe and rests against a corresponding sealing area of the connecting sleeve. This construction involves an insertion coupling in which the U-shaped clamp must take over the securing of the position also with respect to a possible excess pressure occuring on the inside of the connecting sleeve. In order to keep the surface pressure between a shoulder and the legs of the clamp as low as possible, the clamp has a square cross-section that is adapted to the size of the groove between the shoulders. A disadvantage of this construction is the relatively high expenditures which are required for the manufacturing of an insertion nipple at the end of the pipe. Additionally, the free end of one of the legs of the adapted clamp must be equipped with a safety hook directed toward the outside for the securing of its position.

It is, therefore, an object of this invention to provide a pipe connection having a contact area between a clamp and a collar of a pipe which is as large as possible.

It is another object of this invention to provide a pipe connection having a simple design.

The above and other objects are attained by a pipe connection arrangement including an insertable pipe having a sealing means arranged near one end of the pipe. The pipe includes a collar having a radius (r) and is inserted into a connecting sleeve having a receiving bore therein. The sleeve includes a passage opening formed as at least one slot on the side of the pipe. The arrangement is secured by a clamp shaped in a preferred embodiment as a U-shaped clamp, and includes two legs which are extendable through the slot of the sleeve. The width of the slot corresponds to the external spacing of the legs of the clamp. Additionally, the interior radius of the U-shaped bracket part of the clamp is adapted to correspond to the interior radius (r) of the collar and outer diameter of the pipe. As a result of the invention, the clamp rests against the collar over more than half of its circumference and, therefore, is subjected to a largely even contact pressure. This is very advantageous, especially when the sealing means rests against the collar on the side facing away from the clamp and is pressed into a recess at the connecting sleeve. One resulting effect is a rattle-free fitting of the pipe in the connecting sleeve because the sealing means takes over a double function. This type of fitting arrangement is especially important for use in motor vehicles where, because of the vibrations caused during the driving, a rattle-free fitting is required. The new pipe connection is, therefore, especially suitable for the connecting of the feed pipes to the water tanks of motor vehicle heat exchangers, particularly for motor vehicle heaters. The new pipe connection can also be used in a relatively simple way for connecting sleeves of water tanks made of plastic. Another advantageous feature of the present invention is that the clamp can be inserted into the slot from either side of the pipe, thereby simplifying assembly of the arrangement.

An especially preferred embodiment includes the advantageous feature of providing a gripping clip in the center area of the U-shaped bracket part of the clamp. This clip facilitates the mounting and dismounting of the clamp such that, in an installed condition, the bracket part is pushed into the connecting sleeve. In a particularly simple way, the gripping clip may be developed as another U-shaped clamp which is in alignment with the first U-shaped clamp, the legs of the gripping U-shaped clamp being mounted at the bracket part of the first clamp. This additional gripping clamp can be formed out of the material of the first clamp as a single piece. In this embodiment, it is also advantageous for the slot in the connecting sleeve to include in its center, a reinforcing web extending vertically to the plane of the slot. The reinforcing web grips between the legs of the additional gripping clamp and can serve as a snap-on element for the clamp which has a corresponding narrowing, thereby securing the clamp in its end position.

In especially preferred embodiments, as depicted in the drawings, the conformance of the legs and bracket part of the clamp extend substantially over the circumference of the pipe adjacent to the collar in order to provide a simple and secured connection. Preferably, between 90° to 180° of the inner circumference of the collar is adjacent with the U-shape clamp.

Further objects, features, and advantages of the present invention will become more apparent from the following description when taken with the accompanying drawings which show, for purposes of illustration only, an embodiment in accordance with the present invention.

BRIEF DESCRIPTION OF THE DRAWINGS

FIG. 1 is a sectional view of side of a water tank for a motor vehicle heater having a pipe connection arrangement in accordance with a preferred embodiment of the present invention;

FIG. 2 is a top view of the connecting arrangement of the water tank of FIG. 1;

DETAILED DESCRIPTION OF THE DRAWINGS

Figure 3:
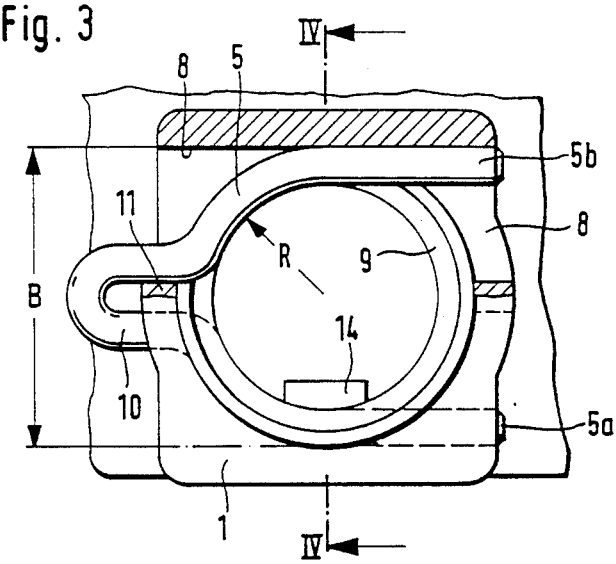
FIG. 3 is an enlarged view of the connecting sleeve shown in FIG. 2.
Figure 4:
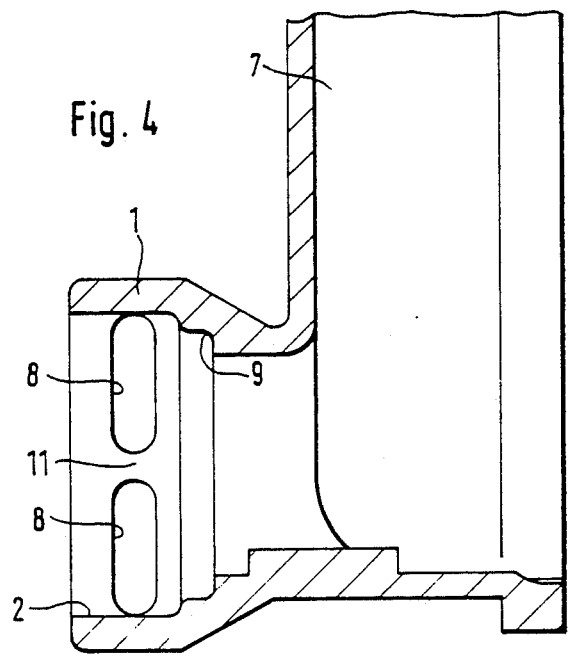
FIG. 4 is a sectional view of the connecting arrangement of FIG. 3 along line IV—IV.

FIGS. 1 and 2 show a water tank 7 which can be connected with, for example, a pipe sheet that is part of a ribbed pipe block. A liquid, such as the cooling water of the engine or another liquid, flows through said ribbed pipe block for conducting heat from the block to the surrounding air.

The heat exchange liquid reaches the hollow space of the water tank 7 through an opening 2 of a connecting sleeve 1 into which the end 3 of a pipe is axially inserted. This pipe 3 is held in the connecting sleeve 1 by means of a clamp 5 that is formed in a U-shape having two legs 5a, 5b. From the direction of one side, the legs 5a, 5b are slid into a slot 8 that extends vertically to the axis of the pipe 3. The slot has a height that corresponds approximately to the diameter of the round wire of which the clamp 5 is formed. The slot 8 is accessible from both sides of the pipe. Reinforcing webs 11 are arranged in the center between the access opening of the slot 8, which are used on the one hand for stiffening of the connecting sleeve 1 and, on the other hand, for securing the position of the clamp 5.

Figure 5:
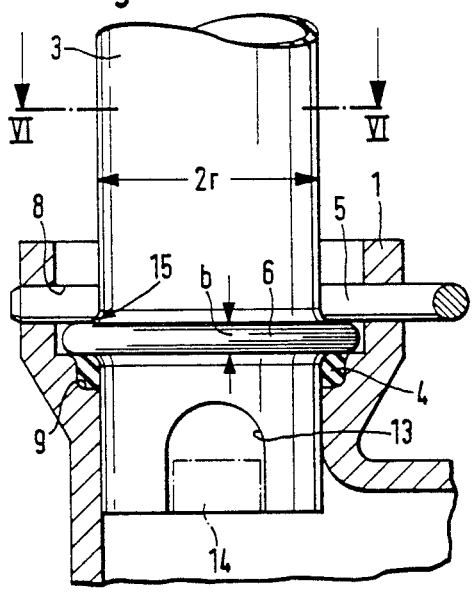
FIG. 5 is an enlarged view of the connecting arrangement along line V—V in FIG. 2, the clamp being inserted in an orientation displaced by 180° with respect to the view in FIG. 2.
Figure 6:
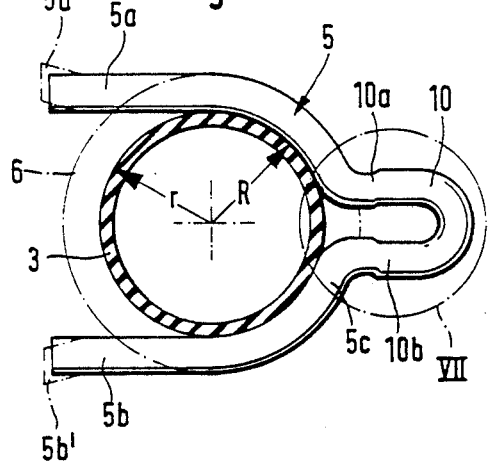
FIG. 6 is a sectional view of FIG. 5 along line VI—VI.

As shown in FIGS. 5 and 6, the pipe 3 shown in its installed position is equipped with a collar 6 formed by compression, with a rounding 15 being provided at the transition from the pipe diameter to the collar 6. The clamp 5 rests against a side of the collar 6 which faces the opening of the connecting sleeve 1. A U-shaped bracket part 5c of the clamp 5 is formed with a radius R in such a way that the bracket part 5c is tightly fitted at the outer circumference of the pipe 3 which has a diameter equal to (2r). A sealing ring 4 made of rubber or plastic and formed with a round cross-section, rests against the side of the collar 6 facing away from the clamp 5 and opening of the connecting sleeve 1. The sealing ring 4, as shown in FIG. 5, is pressed by the collar 6 into a ring-shaped recess 9 of the connecting sleeve 1. The dimensions of the collar 6 (having b width), of the recess 9 and the sealing ring 4 are adapted in this embodiment to the position of the slot 8 and the diameter of the clamp 5 in such a manner that the position shown in FIG. 5 is reached in the installed condition in which the sealing means 4 is elastically pressed together when the clamp 5 is inserted into the slot.

In this way, an elastic sealing is achieved between the connecting sleeve 1 and the pipe 3. The pipe 3 rests against the clamp 5 under the elastic force. As a result, rattling noises in the case of a movement of the water tank used in preferably a motor vehicle heater, do not occur.

Since bracket part 5c of the clamp 5 is formed so that it is adapted to the outer diameter of the pipe 3, over more than half the ring formed by the collar 6 rests on the bracket part, and therefore, provides a very even load transmission and also a good securing of the position of the pipe in the connecting sleeve 1. In order to avoid a twisting of the pipe 3, which is necessary because of the connecting parts at the other pipe end (not shown), the free end of the pipe 3, has a slot 13 that is rounded off in upward direction which reaches over a projection 14 on the interior side of the connecting sleeve 1. The representation of projection 14 according to FIG. 5 is shown by an interrupted line because the representation is located on the side of the connecting sleeve 1 facing the viewer.

Figure 8:
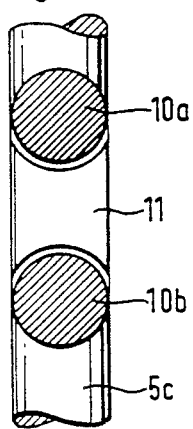
FIG. 8 is a sectional view of the clamp of FIG. 7 along VIII—VIII.
Figure 7:
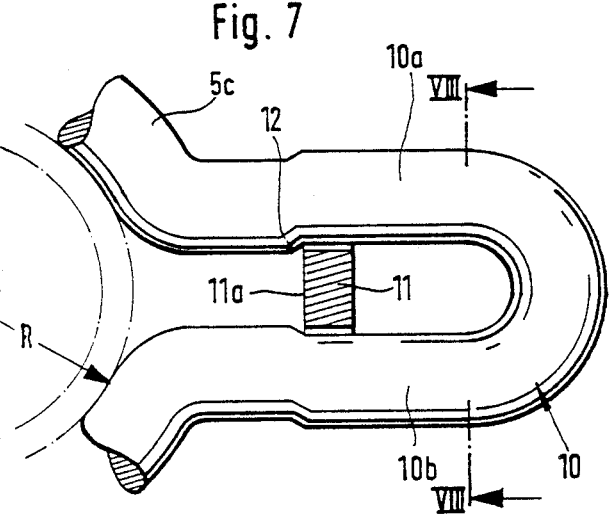
FIG. 7 is an enlarged view of the area VII of FIG. 6.

The clamp 5 has two legs 5a and 5b that extend in parallel to one another, the mutual outer spacing of which is selected in such a way that it corresponds to the width B of the outer spacing of the slots 8. These two legs 5a and 5b coverage into the bracket part 5c on which, as shown in FIGS. 6 to 8, an additional U-shaped clamp 10 borders as one piece. The clamp 10, as shown in FIGS. 2 and 3, projects toward the outside over the connecting sleeve 1 and can therefore be used as a means for the mounting and dismounting of the clamp 5. The clamp 10 has two legs 10a, 10b that also extend in parallel to one another and are bent away from the bracket part 5c of the clamp 5. In the area of these legs 10a and 10b, a narrowing 12 as shown in FIG. 7 is provided such that, in an inserted position of the clamp 5 according to FIG. 5, the legs 10a and 10b snap behind the interior edge 11a of the reinforcing web 11, and thus, secure the position of the clamp 5. For this purpose, the web 11 is developed sufficiently wide such that it can provide this securing function.

It is also contemplated in another preferred embodiment (FIG. 6) to secure the position of the clamp 5 by slightly bending the free ends 5a' and 5b' of the legs 5a and 5b of the clamp 5 toward the outside so that they can secure the clamp 5. However, it is noted that the above-described preferred embodiment having the narrowing 12 at the clamp 10 would be simpler in certain aspects regarding mounting and dismantling since the sides of the slots 8 having the bent free ends may be impaired by the insertion and removal of the ends 5a' and 5b'.

Although the present invention has been described and illustrated in detail, it is to be clearly understood that the same is by way of limitation. The spirit and scope of the present invention are to be limited only by the terms of the appended claims.

What is claimed:

1. A pipe connection arrangement for a motor vehicle of the type having a heat exchanger fluid tank, said arrangement comprising:

insertable pipe means having a collar means formed on said pipe means with an inner circumference along an outer circumference of said pipe means;

connecting sleeve means having a receiving bore therein for receiving said insertable pipe means, said sleeve means having openings formed as slots on a side thereof; and clamping means having a first and second leg means extendable through said slots of said sleeve means when in a clamping position adjacent said collar means, said leg means being interconnected by a bridging bracket portion, wherein the leg means and bracket portion are conformed to the inner circumference of said collar means along a substantial portion of said inner circumference, to thereby clampingly engage said pipe means adjacent said collar means;

wherein outer spacing of said leg means corresponds to the outer spacing of opposing edges of said slots of said connecting sleeve means, along at least a substantial portion of opposing edges of said slots when in a clamped position;

wherein said clamping means is formed as an open-ended U-shaped clamp, wherein said leg means each include a first and second end, with said bridging bracket portion connecting said first ends of said first and second leg means;

further comprising a sealing means resting against a side of said collar means which faces away from said clamping means for elastically sealing said connecting sleeve means and said pipe means, wherein the connecting sleeve means is provided with a circular recess for receiving said sealing means, said sealing means causing said pipe means to rest against said clamping means under elastic force;

wherein said collar means is formed by compression metal deformation with said collar means converging into said pipe means, said pipe means having a radius corresponding to a radius of the leg means and bridging bracket portion of said clamping means, said clamping means being formed of a round wire, wherein the dimensions of said collar means, the recess and the arrangement of said slots are selected in such a way said sealing means is pressed into said recess of said collar means.

2. The arrangement of claim 1, wherein said leg means and said bracket portion conform to said inner circumference of said collar means along a portion between 90° to 180° of said collar means inner circumference.

3. The arrangement of claim 1, further including a gripping means mounted in the center area of said bracket portion, said gripping means projecting to the side facing away from said first and second leg means of said clamping means.

4. The arrangement of claim 3, wherein said gripping means is formed in a U-shape and arranged in alignment with said clamping means, said U-shaped gripping means including a pair of leg means which are mounted at the bridging bracket portion of said clamping means.

5. The arrangement of claim 3, wherein said gripping means is formed together with said clamping means as an integral one-piece structure of the same materials.

6. The arrangement of claim 3, wherein said connecting sleeve includes a reinforcing web extending centrally to the slots and transverse to the plane of said slots, said reinforcing web extending between and being clamped by said leg means of said U-shape gripping means.

7. The arrangement of claim 6, wherein said gripping means on its side facing said bracket portion of said clamping means has a narrowing between its leg means, wherein a transitional section between said bracket portion of said clamping means and said gripping means rests against said collar means of said pipe means, and engages behind an edge of said reinforcing web when in a clamped position.

8. The arrangement of claim 1, wherein a free end of said insertable pipe means is provided with a notch and said connecting sleeve means includes a projecting means arranged on the interior side of said connecting sleeve means, said notch being arranged over said projecting means when said insertable pipe means engages with said connecting sleeve means for securing said pipe means from rotational movement.

9. The arrangement of claim 1, wherein said first and second leg means are bent outwardly at said second ends of said first and second leg means to aid in engagement of said leg means in said slots.

10. A pipe connection arrangement for a motor vehicle of the type having a heat exchanger fluid tank, said arrangement comprising:

insertable pipe means having a collar means formed on said pipe means with an inner circumference along an outer circumference of said pipe means;

connecting sleeve means having a receiving bore therein for receiving said insertable pipe means, said sleeve means having openings formed as slots on a side thereof; and clamping means having a first and second leg means extendable through said slots of said sleeve means when in a clamping position adjacent said collar means, said leg means being interconnected by a bridging bracket portion, wherein the leg means and bracket portion are conformed to the inner circumference of said collar means along a substantial portion of said inner circumference, to thereby clampingly engage said pipe means adjacent said collar means;

wherein outer spacing of said leg means corresponds to the outer spacing of opposing edges of said slots of said connecting sleeve means, along at least a substantial portion of opposing edges of said slots when in a clamped position;

wherein said clamping means is formed as a U-shaped clamp, wherein said leg means each include a first and second end, with said bridging bracket portion connecting said first ends of said first and second leg means;

further including a gripping means located in the center area of said bracket portion, said gripping means projecting to the side facing away from said first and second leg means of said clamping means;

wherein said connecting sleeve includes a reinforcing web extending between the slots and transverse to the plane of said slots, said reinforcing web extending between and being clamped by leg means of said gripping means.

11. The arrangement of claim 10, wherein said gripping means on its side facing said bracket portion of said clamping means has a narrowing between its leg means, wherein a transitional section between said bracket portion of said clamping means and said gripping means rests against said collar means of said pipe means, and engages behind an edge of said reinforcing web when in a clamped position.

* * * * *